(12) United States Patent
Aliberti

(10) Patent No.: US 12,098,565 B2
(45) Date of Patent: Sep. 24, 2024

(54) FLOATING INSECT CANOPY

(71) Applicant: Christopher Aliberti, Scottsdale, AZ (US)

(72) Inventor: Christopher Aliberti, Scottsdale, AZ (US)

( * ) Notice: Subject to any disclaimer, the term of this patent is extended or adjusted under 35 U.S.C. 154(b) by 0 days.

(21) Appl. No.: 18/424,523

(22) Filed: Jan. 26, 2024

(65) Prior Publication Data

US 2024/0209653 A1 Jun. 27, 2024

Related U.S. Application Data

(63) Continuation of application No. PCT/US2023/032913, filed on Sep. 15, 2023.

(60) Provisional application No. 63/407,603, filed on Sep. 16, 2022.

(51) Int. Cl.
| | |
|---|---|
| *E04H 15/02* | (2006.01) |
| *A01M 29/34* | (2011.01) |
| *A47C 29/00* | (2006.01) |
| *E04H 15/40* | (2006.01) |
| *E04H 15/58* | (2006.01) |
| *E04H 15/64* | (2006.01) |

(52) U.S. Cl.
CPC .............. *E04H 15/02* (2013.01); *A01M 29/34* (2013.01); *A47C 29/006* (2013.01); *E04H 15/405* (2013.01); *E04H 15/58* (2013.01); *E04H 15/64* (2013.01)

(58) Field of Classification Search
None
See application file for complete search history.

(56) References Cited

U.S. PATENT DOCUMENTS

| | | | | |
|---|---|---|---|---|
| 5,163,461 A * | 11/1992 | Ivanovich | ................. | E04H 6/04 |
| | | | | 135/905 |
| 5,337,772 A * | 8/1994 | Habchi | ................... | E04H 15/40 |
| | | | | 135/156 |
| 5,690,133 A * | 11/1997 | Capwell | ................. | B63B 17/02 |
| | | | | 135/96 |
| 6,062,243 A * | 5/2000 | Tuch | ....................... | E04H 15/36 |
| | | | | 135/124 |
| D441,040 S * | 4/2001 | Cho | ............................ | D21/705 |
| 6,672,323 B2 * | 1/2004 | Gupta | .................... | E04H 15/40 |
| | | | | 135/905 |
| 6,881,114 B2 * | 4/2005 | Zheng | ...................... | B63C 9/04 |
| | | | | 441/129 |

(Continued)

*Primary Examiner* — David R Dunn
*Assistant Examiner* — Danielle Jackson
(74) *Attorney, Agent, or Firm* — Invention To Patent Services; Alex Hobson

(57) ABSTRACT

A floating insect canopy forms a canopy enclosure when floating on the water, such as a pool. The floating insect canopy has a float that extends around the canopy perimeter to form a floating base. The float material may be a foam that is configured in a float sleeve. The canopy may be a netting material that enables a person visibility through the canopy when floating on a raft inside the canopy enclosure. A floating insect canopy forms a generally dome type shape by the use of a flexible extensions configured within an extension sleeve. The extension sleeve retains the flexible extensions and causes the dome shaped canopy enclosure to be automatically formed and retained by the flexible extensions. A door panel may be formed in the canopy.

18 Claims, 11 Drawing Sheets

(56) References Cited

U.S. PATENT DOCUMENTS

| | | | |
|---|---|---|---|
| 7,523,719 B2* | 4/2009 | Miller | A01K 31/08 |
| | | | 119/496 |
| 2003/0046755 A1* | 3/2003 | Hingle | E04H 4/14 |
| | | | 4/498 |
| 2008/0190473 A1* | 8/2008 | Mettavant | E04H 15/56 |
| | | | 135/126 |
| 2010/0186793 A1* | 7/2010 | Adamovich | E04H 15/44 |
| | | | 135/124 |
| 2019/0048613 A1* | 2/2019 | Bierwolf | E04H 15/40 |

* cited by examiner

FLOATING INSECT CANOPY

CROSS REFERENCE TO RELATED APPLICATIONS

This application is a continuation of International patent application No. PCT/US2023/032913, filed on Sep. 15, 2023, which claims the benefit of priority to U.S. provisional patent application No. 63/407,603, filed on Sep. 16, 2022; the entirety of which is incorporated by reference herein.

BACKGROUND OF THE INVENTION

Field of the Invention

The invention relates to a floating insect canopy that is configured to float on water and form a canopy to prevent insects from penetrating into the canopy enclosure.

Background

Many people like to enjoy their pools by floating on floatation devices, such as an inflatable raft or lounge chair but find insects, including fly, bees and mosquitos to be a nuisance and/or a health risk.

SUMMARY OF THE INVENTION

The invention is directed to a floating insect canopy that forms a canopy enclosure when floating on the water, such as a pool. The floating insect canopy has a float that extends around the canopy perimeter to form a floating base. The float may be a foam material that is configured in a float sleeve. The canopy may be a netting material having a structure that enables visibility through the canopy when floating on a raft inside the canopy enclosure. A floating insect canopy forms a generally dome shape with a base opening for getting into the canopy enclosure or for placing the canopy enclosure over a person. A person may simply lift the canopy enclosure and place the canopy enclosure over them. The dome shape is formed by a flexible extension, such as a flexible rod(s), retained to the canopy, such as being configured within an extension sleeve. In an exemplary embodiment, the flexible extension extends along a perimeter of a hyperbolic paraboloid shape with the canopy extending overt this shape to form the dome shaped canopy enclosure that is automatically formed and retained by the flexible extensions.

An exemplary floating insect canopy forms a canopy enclosure between the canopy and the water. The canopy or canopy material may be netting that prevents insects from passing therethrough but is also substantially translucent to enable a person to see and converse with others through the canopy. The dome shape is formed by the use of a flexible extension, such as a flexible rod(s), that may be retained with respect to the canopy by a retainer, such as an extension sleeve. The flexible rod may want to expand into a circle but retaining it within the extension sleeve causes the flexible extension to form the dome shape. As described herein, the flexible extension may extend along a hyperbolic paraboloid perimeter with opposing ends of the flexible extension hoop extending down to the float. The flexible extension may be a plastic rod that is configured to automatically pop up to form the dome shaped enclosure. The canopy extends up from the float, such a foam material or an inflatable bladder. A foam may be a polyurethane foam and may have a density less than 1.0 g/cc to enable the float to float on water and to keep the floating insect canopy floating on water. The float forms a float ring and may have a float sleeve to retain the float therein. The canopy s coupled to the float ring to form the canopy enclosure over the water. The canopy may be attached to the float sleeve.

An exemplary floating insect canopy may have a door panel that can be opened to allow a person to hand items, such as food or drink through the door opening. The door panel may be configured within the flexible extension hoop. The door panel may be rolled or folded up and then retained by door retainers configured at the top of the door panel. Door retainers may be straps or hook-and-loop fasteners, for example.

A flexible extension may be a resilient flexible material, such as a plastic rod that can be bent and then return to an unbent shape upon removal of a bending force. A plastic rod may be preferred to reduce weight and cost. The plastic rod may be polyethylene or polypropylene for example and may be about 30 mm or less in diameter, about 25 mm or less in diameter, about 20 mm or less in diameter, about 15 mm or less in diameter and any range between and including the values provided.

An exemplary floating insect canopy may be collapsible and may be folded and placed into a case for storage. The case may be a bag having a handle for carrying the floating insect canopy.

A canopy may be a netting material that has apertures small enough to prevent common insects including flies and mosquitos from passing therethrough. The apertures size in the netting may be about 6 mm or less, about 5 mm or less, about 4 mm or less, about 3 mm or less and any range between and including the apertures size values provide. The size of the aperture may be the largest straight line distance across the aperture. The canopy or netting may be substantially translucent that enables a person having at least 20/20 vision or better to read a book with 12 font through the canopy.

Where there are discrepancies between the disclosure in this application and any prior patent application from which this application claims the benefit thereto, the disclosure in this application shall dominate. Changes may have been made from prior applications for clarity.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
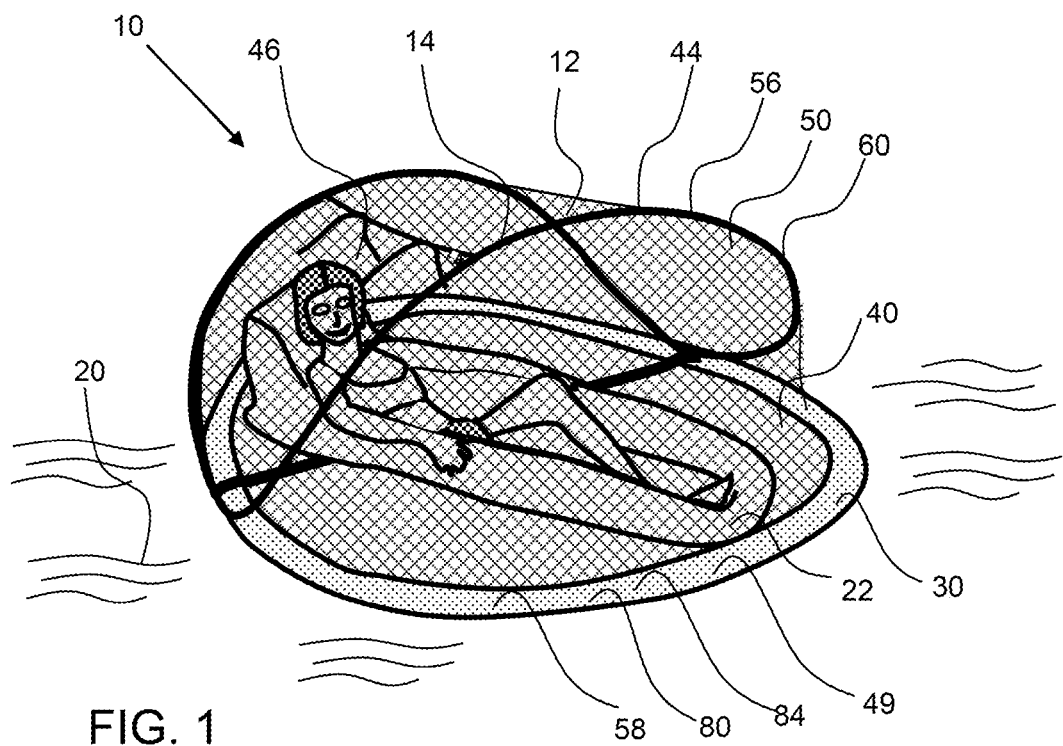
FIG. 1 shows a perspective view of the floating insect canopy floating on water in a pool and a person resting on a raft within the canopy enclosure.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 12, an exemplary floating insect canopy 10 forms a canopy enclosure 12 between the canopy 14 and the water 20. The canopy or canopy material may be netting 50 that prevents insects from passing therethrough but is also substantially translucent to enable a person to see and converse with others through the canopy. The dome shape is formed by the use of a flexible extension 60, such as a flexible rod(s), that may be retained with respect to the canopy 14 by a retainer, such as an extension sleeve 56. The flexible rod may want to expand into a circle but retaining it within the extension sleeve causes the flexible extension to form the dome shape. The flexible extension may be a plastic rod that is configured to automatically pop up to form the dome shaped enclosure. The canopy 14 extends up from the float 80, such as a foam 82 material or an inflatable bladder. The float forms a float ring 84 and may have a float sleeve 58 to retain the float 80 therein. The canopy 14 is coupled to the float ring 84 to form the canopy enclosure 12 over the water 20. The canopy may be attached to the float sleeve 58.

Figure 2:
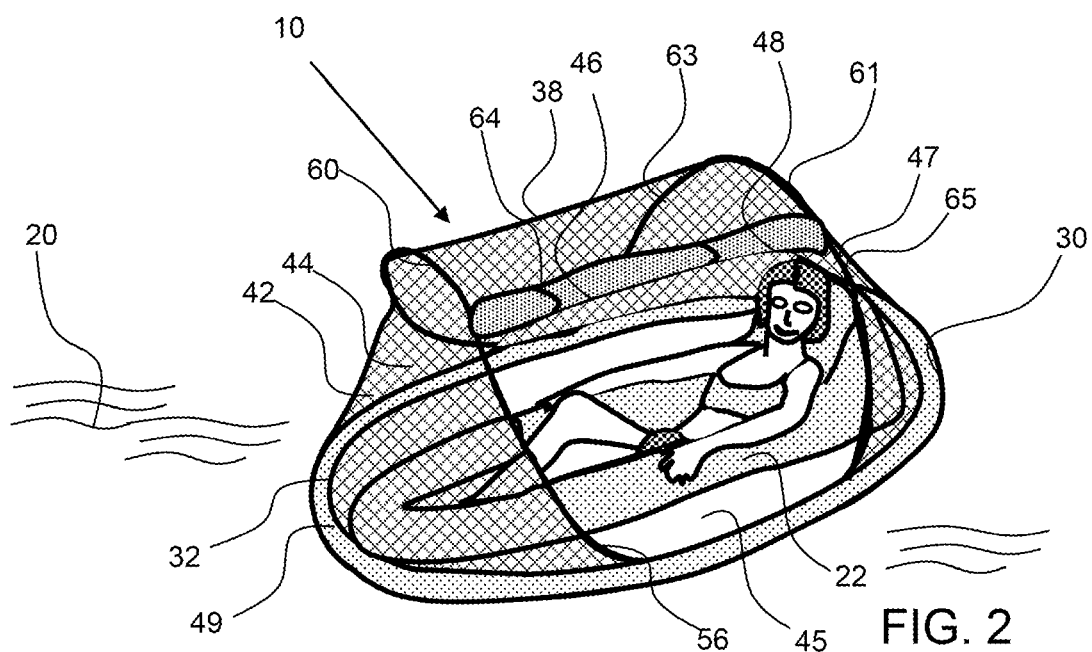
FIG. 2 shows a perspective view of the floating insect canopy floating on the water in a pool and a person resting on a raft within the canopy enclosure, and a second person passing beverage to the person within the floating insect canopy through a door opening.

As shown in FIGS. 1 and 2, a raft 22 is configured within the canopy enclosure 12 and in FIG. 1, a person is protected from insects by being contained within the canopy enclosure 12. As shown in FIG. 2, a door panel 46 is opened to allow the person within the floating insect canopy 10 to receive a beverage through the door opening 45. The door panel 46 is rolled up to the top of the door 48 and retained by door retainers 64, such as a strap or strap that can be tied together to secure the door panel in a rolled up configuration. The door panel 46 has a door panel closure 47, such as a zipper, or hook-and-loop fastener, for example.

Figure 10:
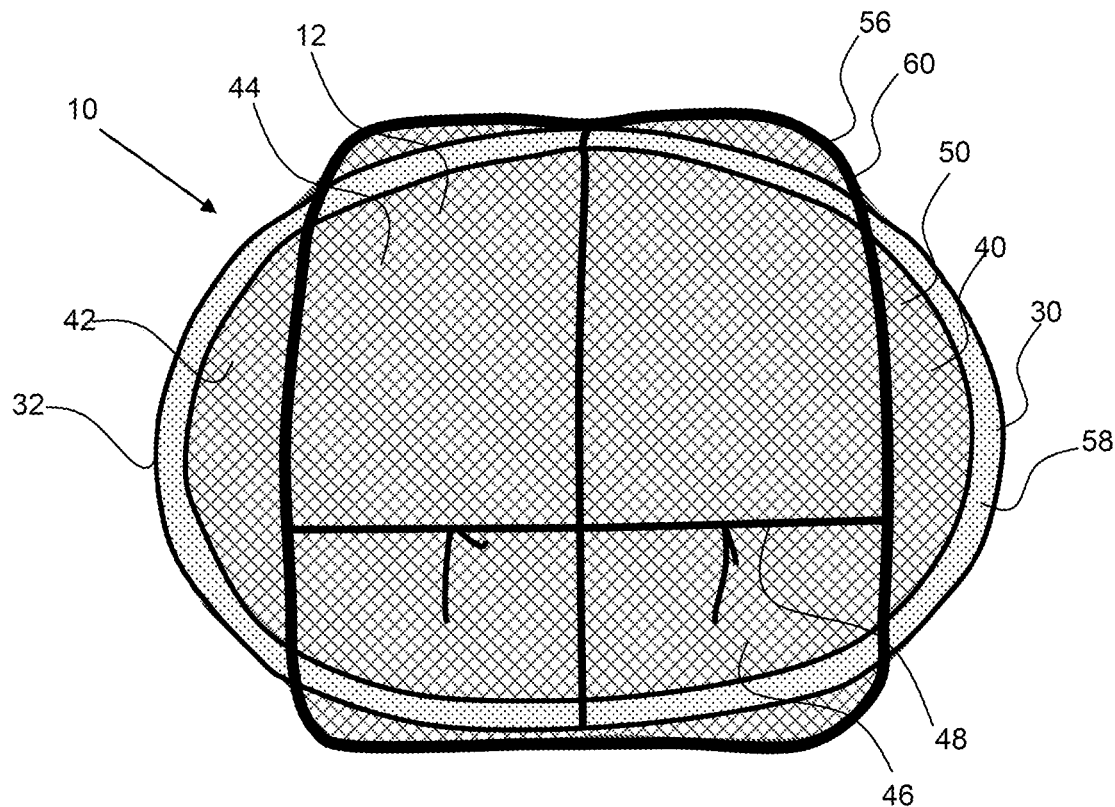
FIG. 10 shows a top view of the floating insect canopy.

An exemplary floating insect canopy 10 has a length from a first end 30 to a second end 32 and a width from a door side 34 to a canopy side 36. The door side may be considered the front and the first end 32 may be considered a right side and the second side the left side, respectively. The perimeter of the floating insect canopy 10 may be oval in shape as best shown in FIG. 10. An extension strap 70 may extend from the door side 34 to the canopy side 36 to draw these sides together to form the oval shaped perimeter. This shape may be desired as it better accommodates the size of most rafts for people to lounge on while floating in the pool. The extension strap may have a strap length adjuster 72, such as a buckle to allow the door side 34 and the canopy side 36 to be drawn together a desired amount. The ratio of the length of the floating insect canopy 10 to the width may be about 1.25 or more, about 1.5 or more, about 1.75 or more, about 2.0 or more and any ratio between and including the ratios provided. The length may be about 3.0 m or less, about 2.5 m or less, about 2.0 m or less, about 1.75 m or less and any range between and including the length values provided. The width may be about 2.5 m or less, about 2.0 m or less, about 1.75 m or less and any range between and including the width values provided. The perimeter may be about 5 m or more, about 6 m or more, about 7 m or more, about 8 m or more, about 9 m or more, about 10 m or less and any range between and including the perimeter values provided. The floating insect canopy 10 may be sized to accommodate a single raft within the canopy enclosure and therefore is may be desirable for the size to be large enough to accommodate a single raft and not too large as it would take up too much space in the pool.

An exemplary floating insect canopy 10 has a height to from the base of the float 80 or float sleeve 58 to the top 38 of the canopy enclosure 12 when configured as an enclosure in FIGS. 1 to 11, to enable a person and the floatation device to comfortably fit within the canopy enclosure 12. The height may be about 1 m or more, about 1.25 m or more, about 1.5 m or less, and any range between and including the values provided. If the height is too low a person may not be able to comfortably maneuver onto a raft within the enclosure.

An exemplary floating insect canopy 10 forms a canopy enclosure 12 with the canopy 14, a netting material, extending in a dome shaped wherein the canopy slopes from a high point at the top 38 down to the canopy perimeter 49 around the base of the floating insect canopy 10, where the canopy is coupled to the float 80, such as being coupled to the float sleeve 58 having the float therein. The canopy 14 has a canopy perimeter 49 that extends around the base of the floating insect canopy 10 and may be coupled with the float 80 or the float sleeve 58.

An exemplary floating insect canopy 10 has a first end panel 40 configured on the first end 30, a second end panel 42 configured on the opposing second end of the floating insect canopy 10 and a centrally extending canopy panel 44 that extends between the first end panel and second end panel. The first end panel and second end panel may be configured on the end of the canopy enclosure with respect to the flexible extension 60. The flexible extension 60 and extension sleeve 56 may extend between the first end panel and the canopy panel 44 which may have door panel 46 therein. The canopy panel extends within the flexible extension 60. Again, the flexible extension and/or flexible extension sleeve forms an extension hoop 61 that enables the flexible extension to automatically form the canopy enclosure. The extension hoop may be a continuous ring and the extension sleeve may be a continuous sleeve that is open continuously to form a sleeve ring.

A floating insect canopy 10 may have a door panel 46 configured within the canopy panel 44 and between the first end panel and the second end panel that can be opened to produce a door opening 45 to allow access into and out of the canopy enclosure 12. The door panel may have a door panel closure 47 such as a zipper or hook-and-loop fastener to enable the door panel to be opened and closed. The door panel 46 enables the canopy enclosure 12 to be opened to form a door opening 45. The door panel may extend along the perimeter along the extension sleeve 56 to a top of the door 48. The door panel may be rolled up and retrained in door retainers 64, such as loops, shown in FIG. 6. The top of the door 48 may be proximal to the top 38 of the floating insect canopy 10.

Figure 3:
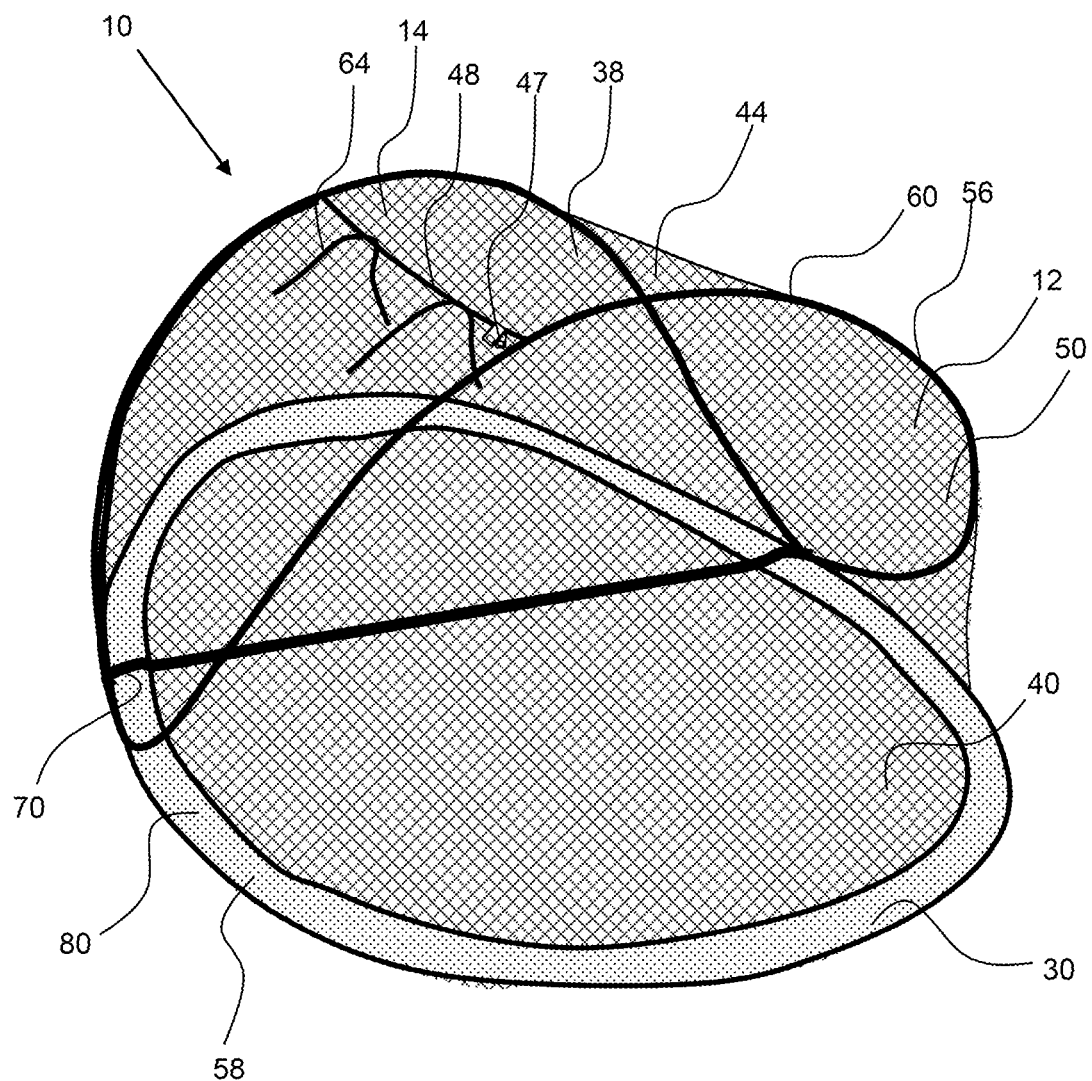
FIG. 3 shows a perspective front first side view of the floating insect canopy.
Figure 4:
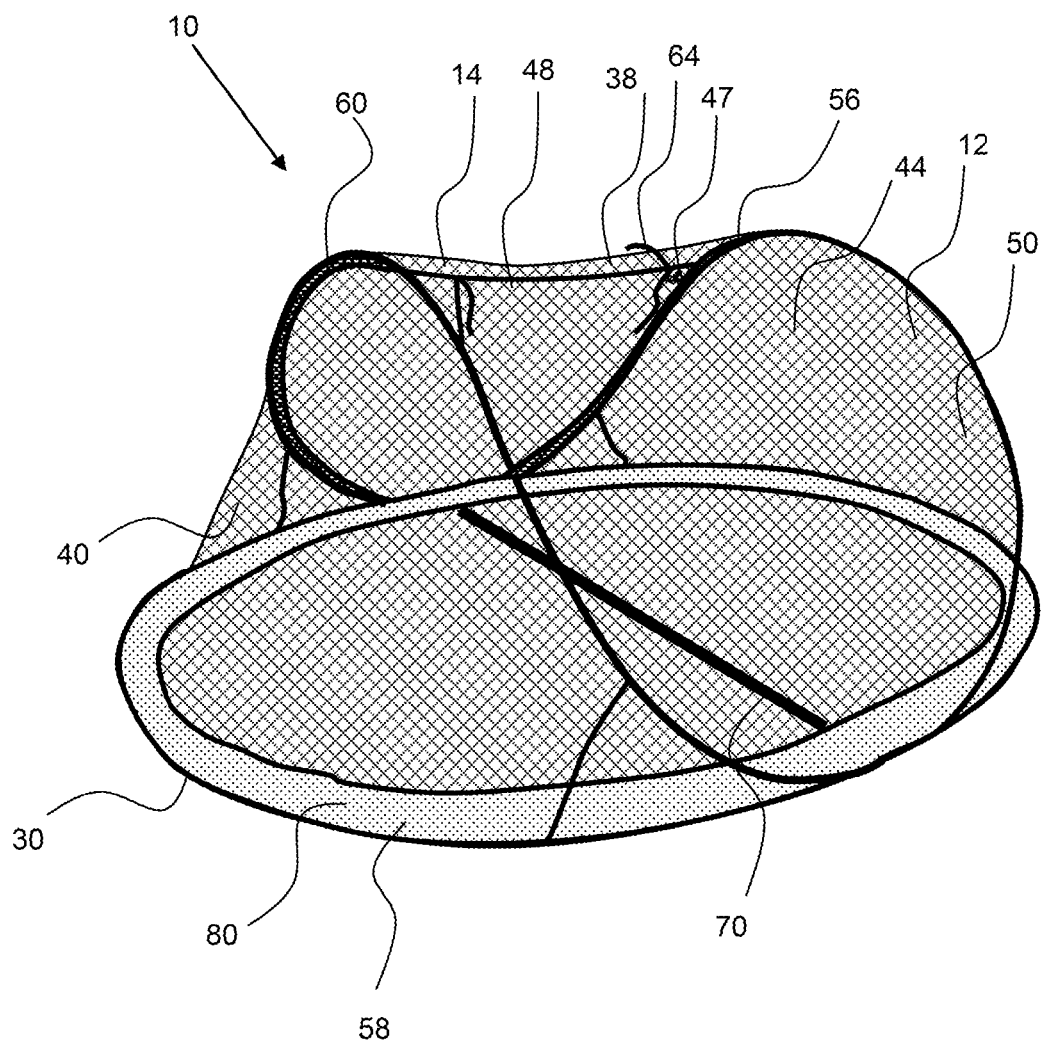
FIG. 4 shows a perspective back first side view of the floating insect canopy.
Figure 5:
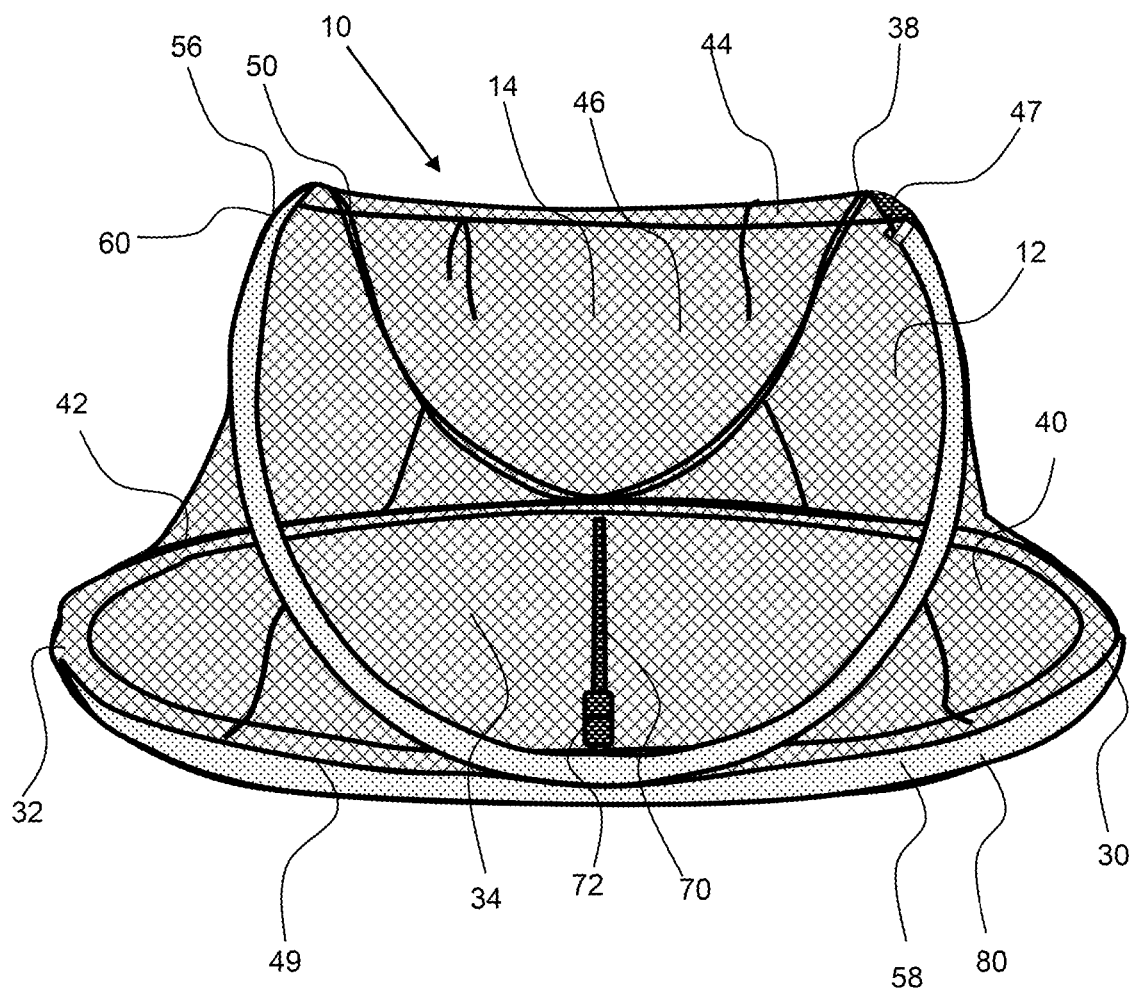
FIG. 5 shows a front side view of the floating insect canopy.
Figure 6:
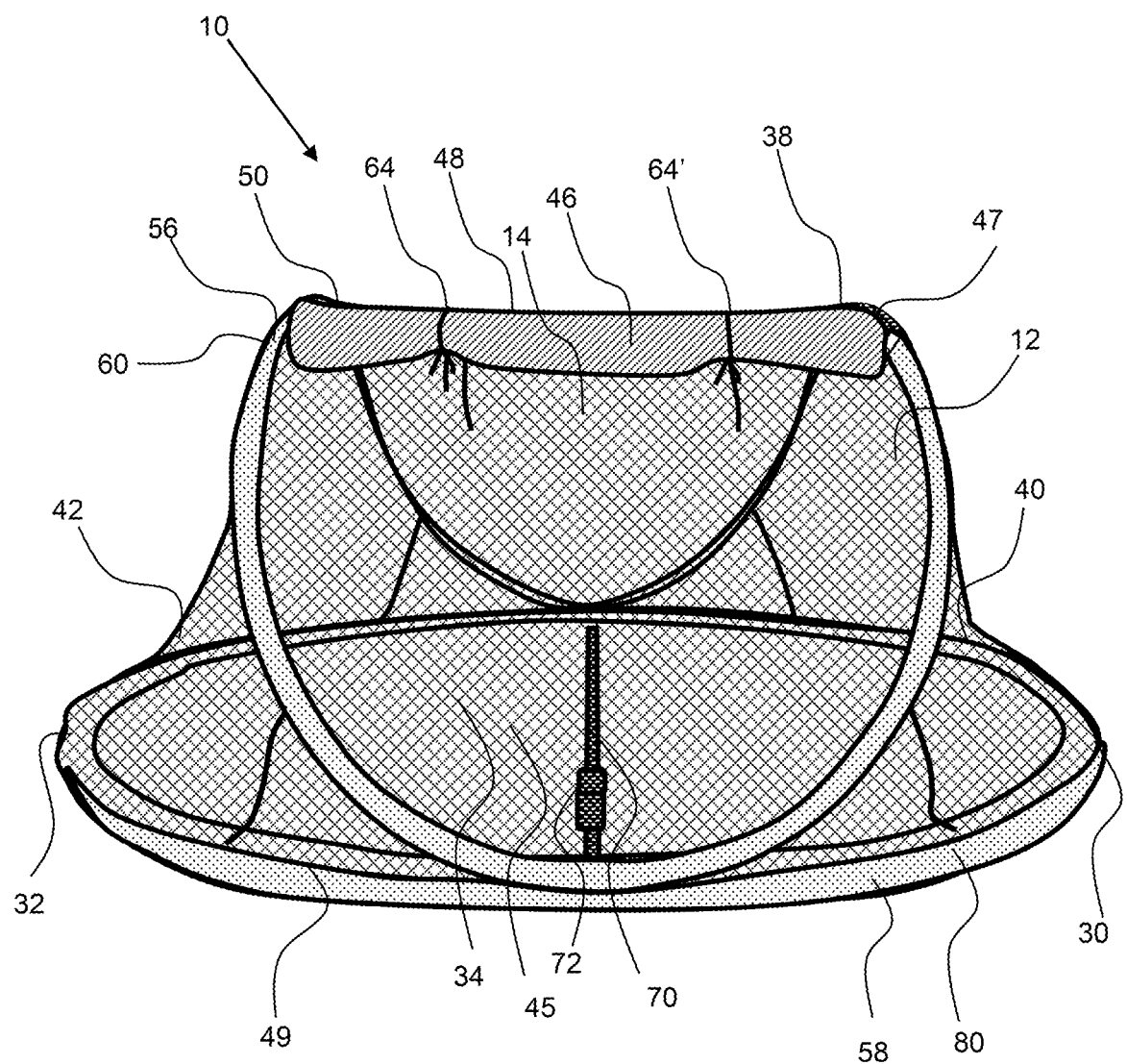
FIG. 6 shows a front side view of the floating insect canopy with the door opened and retained by the door retainers, straps as shown tied around the rolled up door.
Figure 7:
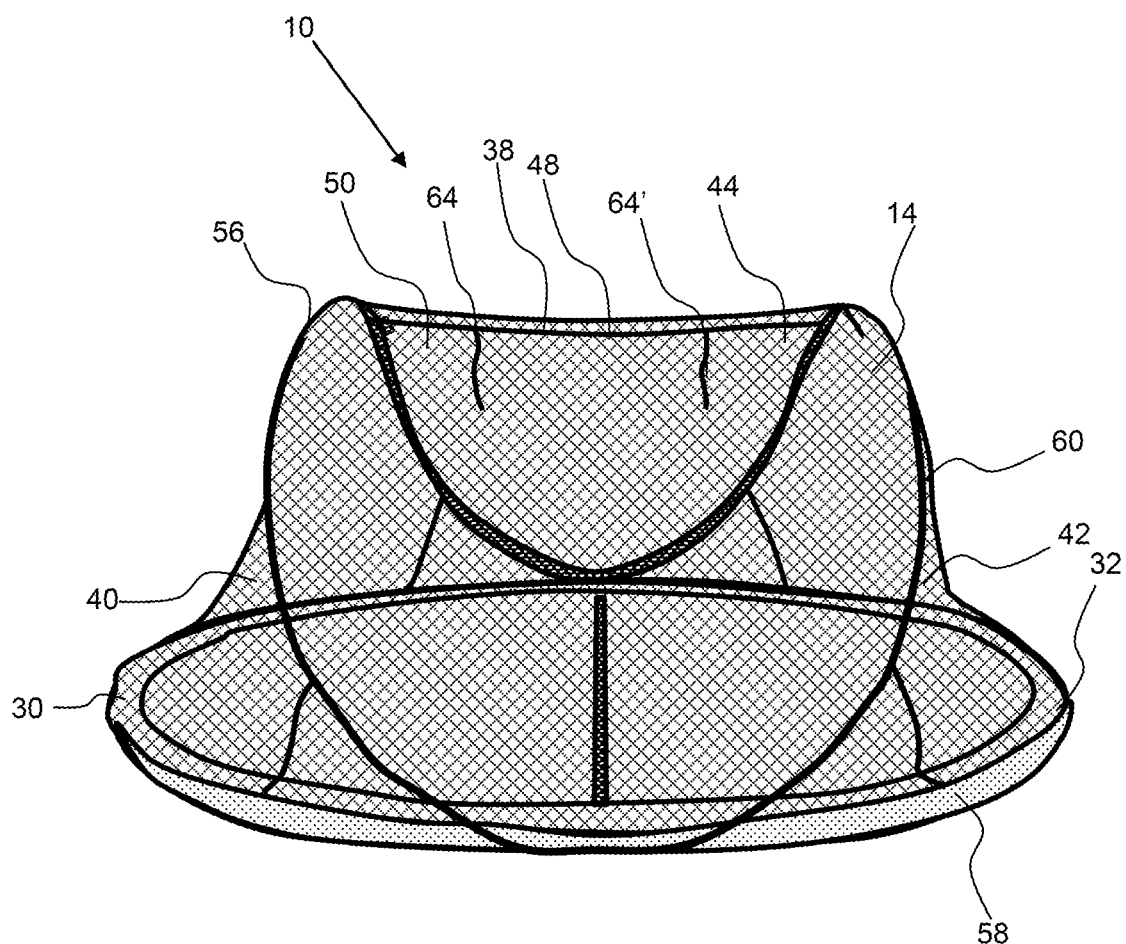
FIG. 7 shows a back side view of the floating insect canopy.
Figure 8:
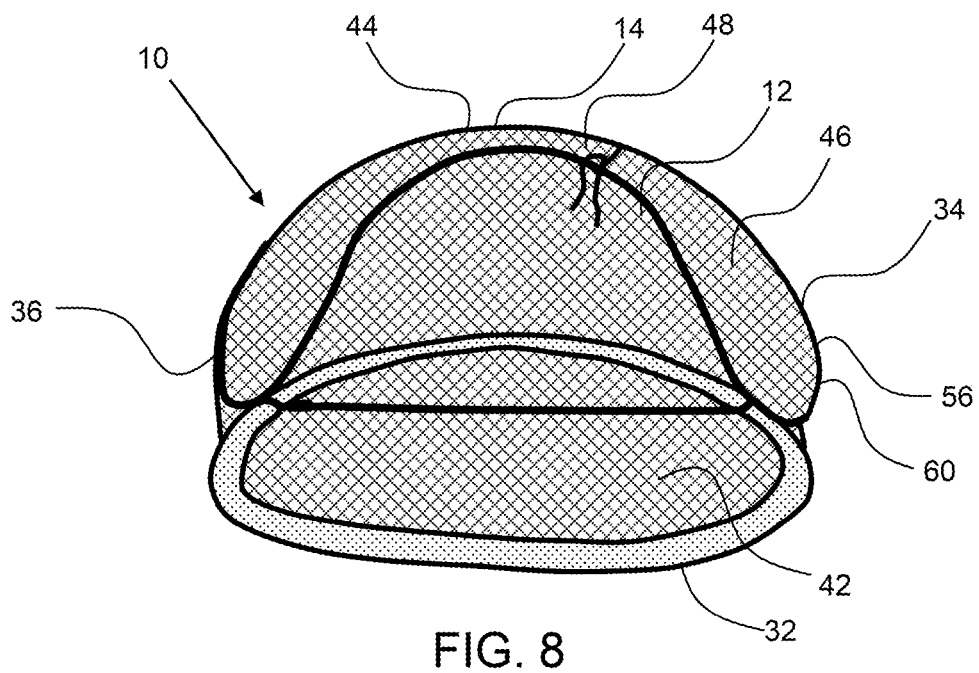
FIG. 8 shows a first side view of the floating insect canopy.
Figure 9:
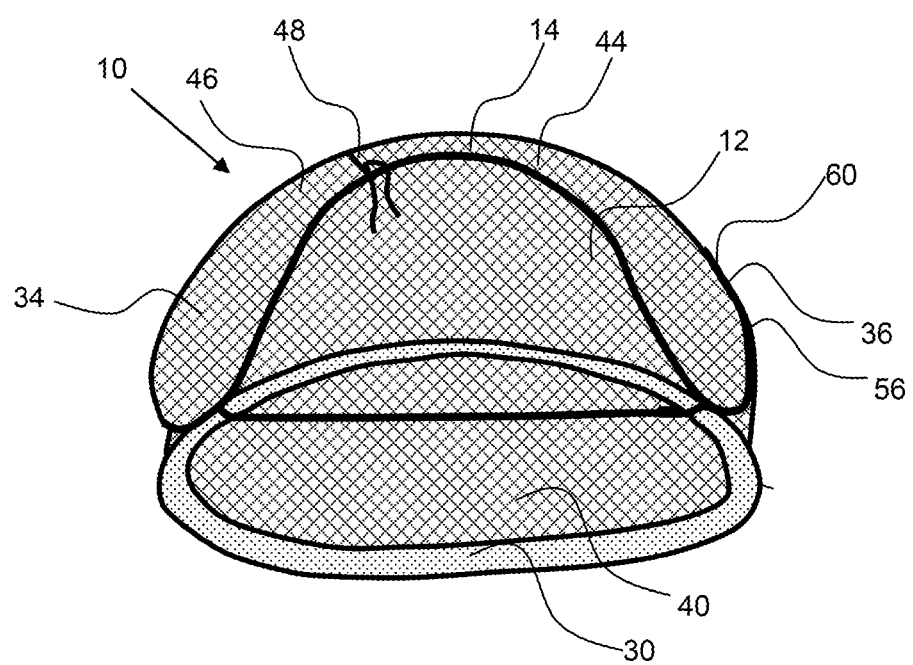
FIG. 9 shows a second side view of the floating insect canopy.

An exemplary floating insect canopy 10 is formed automatically by a flexible extension 60 retained to the canopy 14, such as by being configured within an extension sleeve 56 that is coupled with the canopy 14. A flexible extension may be a flexible rod, such as a plastic rod or metal rod, that is resilient, wherein it can be flexed by a deforming force and will rebound to an original shape upon removal of the deforming force. A flexible extension may be a single continuous extension or be formed by the coupling of a plurality of segments. The floating insect canopy 10 may pop open to the desired configuration automatically by the flexible extensions being restrained within the extension sleeve(s). In an exemplary embodiment, the flexible extension 60 is configured in an extension sleeve 56 that forms a hoop, wherein this hoop extends between the first end panel and the second end panel. This hoop is best shown in FIGS. 3 and 4, wherein the flexible extension forms a hyperbolic paraboloid perimeter shape having a back extension 63 and door extension 65, as shown in FIG. 2, that extend down to the canopy perimeter 49 on opposite sides of the perimeter, the door side 34 and canopy side 36. Note that the flexible extension may not be a continuous hoop buy may be retained such that it forms a hoop shape as shown in the figures. The extension sleeve may form a hoop and the flexible extension may extend into the sleeve to form the hyperbolic paraboloid perimeter shape for supporting the canopy. The canopy panel may extend within the interior of this hoop formed by the extension sleeve and flexible extension. The door panel may be configured within the flexible extension hoop as well. The flexible extension 60 may also extend down to the canopy perimeter 49 to a central location along the door side 34 and also to a central location along the canopy side 36. The hoop or loop may bend over the top 38 of the floating insect canopy 10 and be in compression along the interior of the top, thereby enabling the flexible extension hoop to retain the dome shape. This bent loop or hoop shape of the extension sleeve and flexible extension provide for the flexible dome shape that is automatically formed.

An exemplary floating insect canopy 10 may have a translucent canopy 14 configured substantially around the canopy enclosure 12, wherein each of the first end panel 40, second end panel 42, door panel 46 and canopy panel 44 are a translucent material, such as a netting 50. A substantially translucent canopy enables a person of 20/20 vision to read a book with 12 font through the canopy, such as netting.

Figure 11:
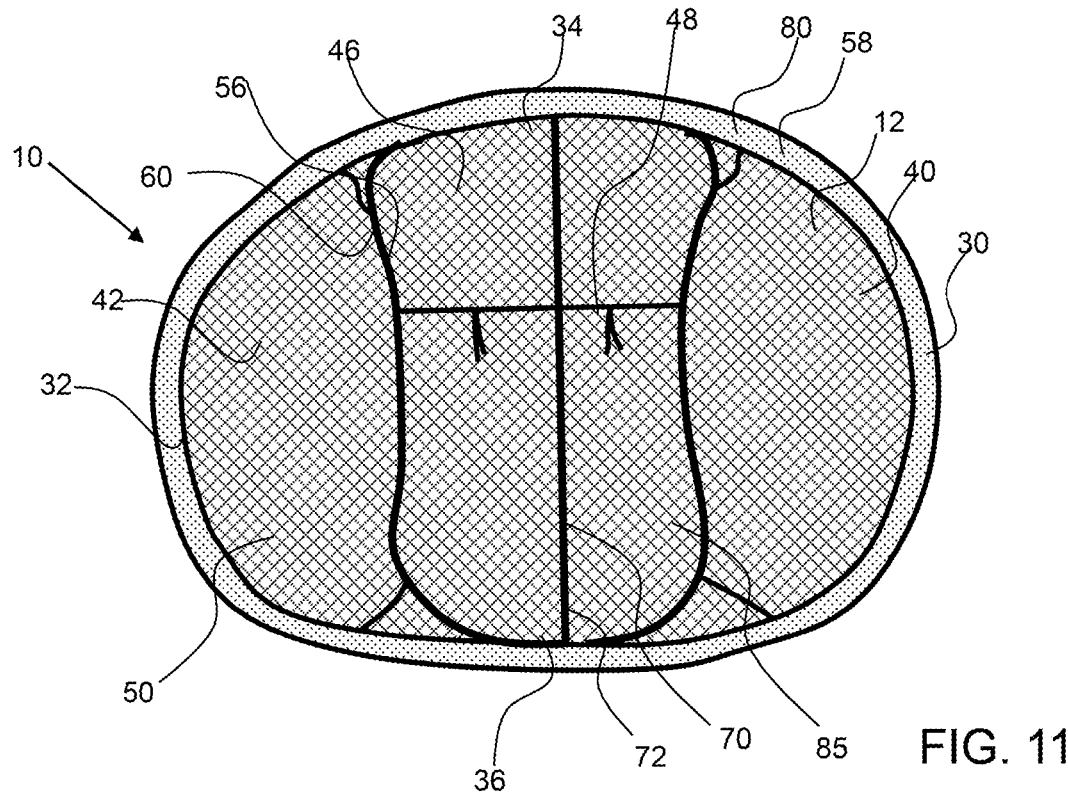
FIG. 11 shows a bottom or base view of the floating insect canopy.
Figure 12:
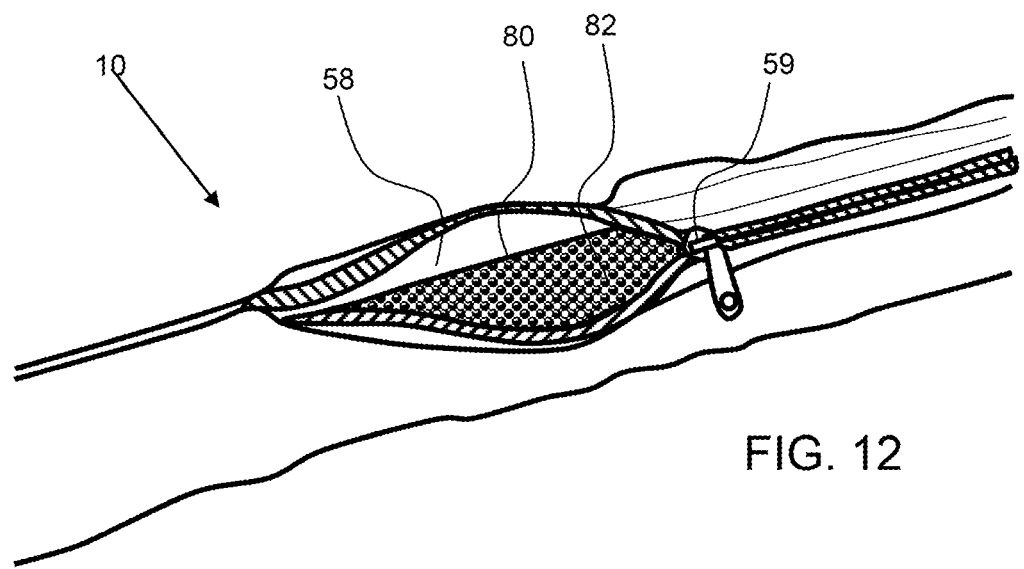
FIG. 12 shows perspective view of the float sleeve having float configured within the float sleeve with the float sleeve closure, a zipper, partially opened.

The floating insect canopy 10 is configured to float by having a float 80 configured around the perimeter of the base opening 85 as shown in FIG. 11. Referring now to FIG. 12, the float may be foam 82, and be a foam rod or cylinder that is configured in the float sleeve 58. The float sleeve may have a float sleeve closure 59, such as a zipper as shown, or a hook-and-loop fastener. The float sleeve and float may extend substantially around the perimeter of the floating insect canopy, or at least 75% of the perimeter or more, about 85% or more, about 90% or more, about 95% or more and any range between and including the values provided. This configuration of the float extending substantially around the perimeter may provide a more reliable floating canopy and may make the canopy more stable on the water.

Figure 13:
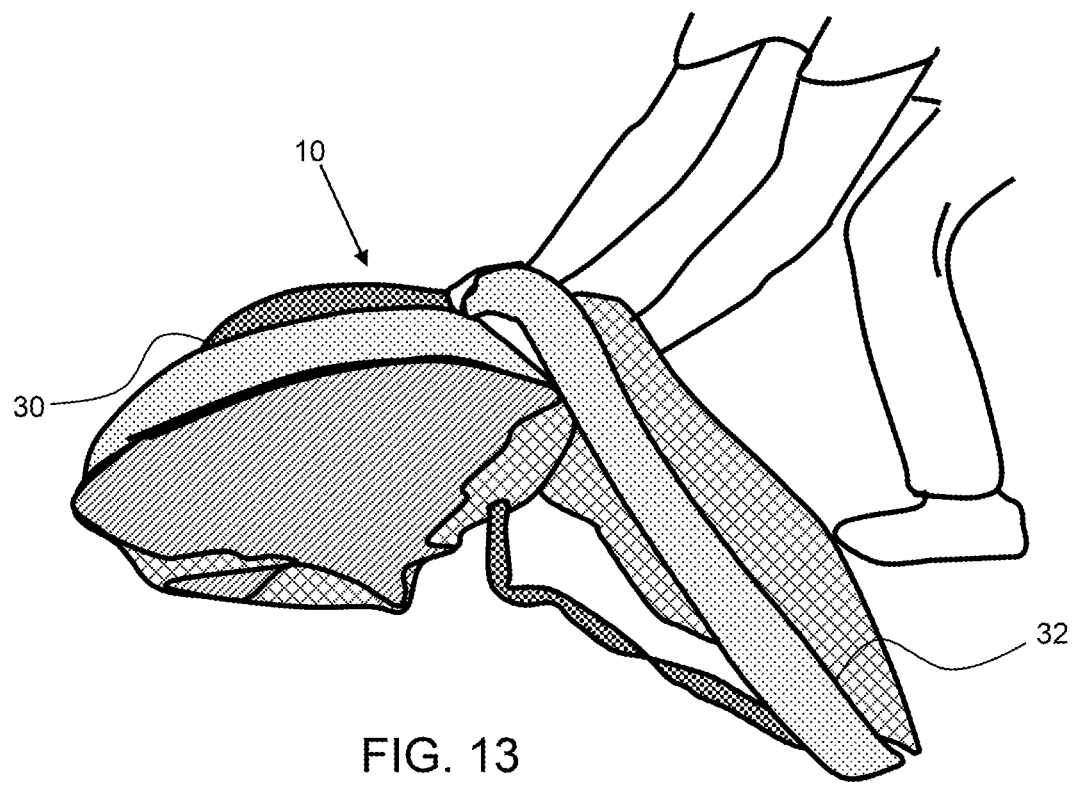
FIG. 13 shows a perspective view of a person folding the floating insect canopy, by bringing the first side toward the second side.
Figure 14:
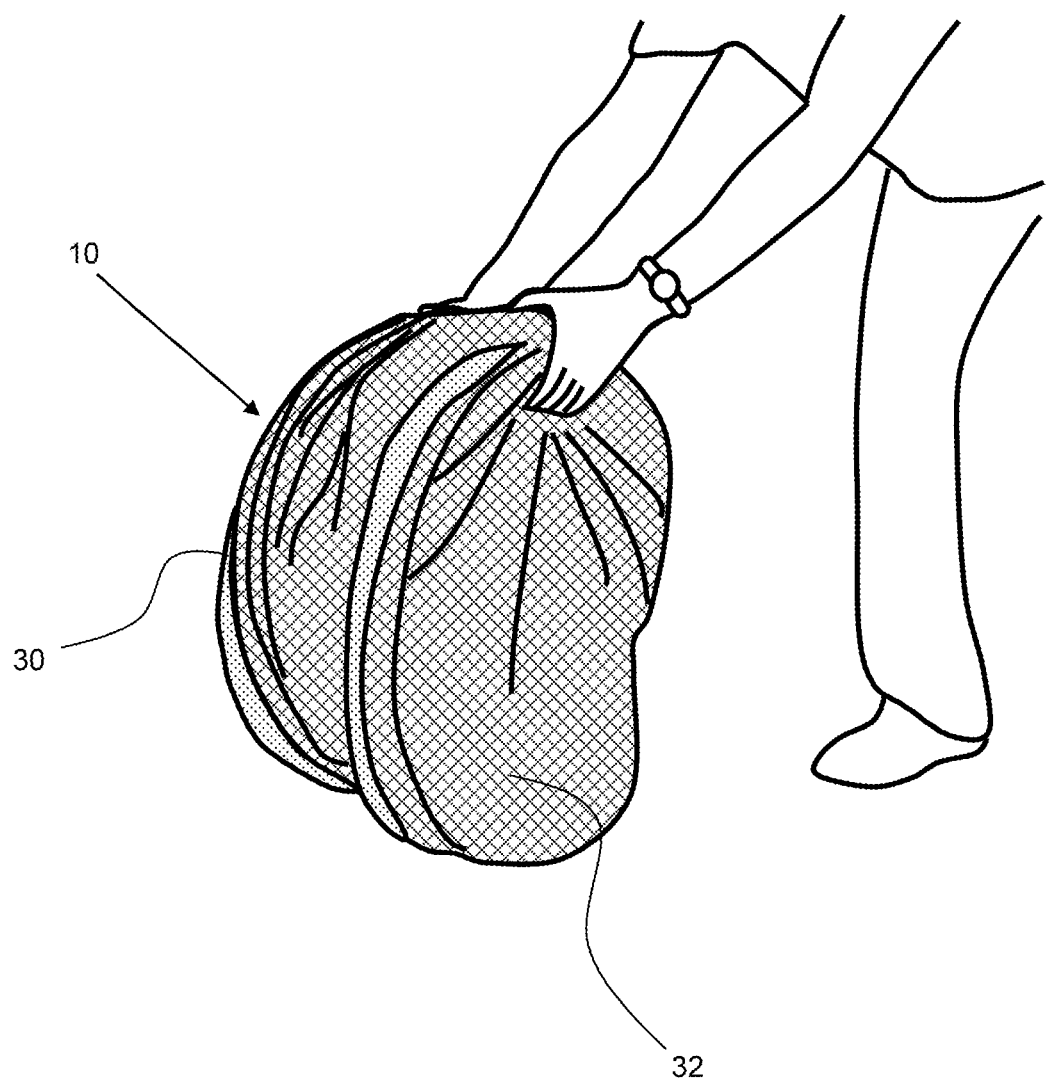
FIG. 14 shows a perspective view of a person folding the floating insect canopy, by bringing the first side toward the second side.
Figure 15:
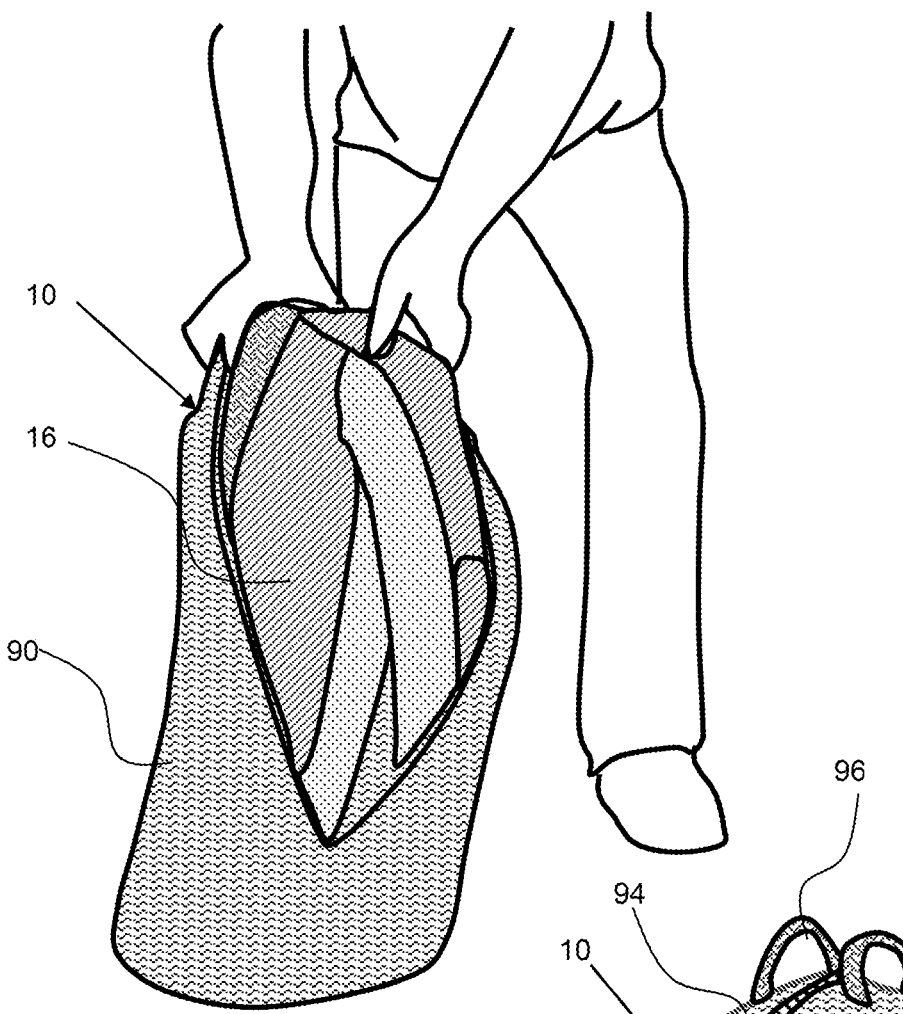
FIG. 15 shows a perspective view of a person inserting the folded and collapsed floating insect canopy into a case, a bag.
Figure 16:
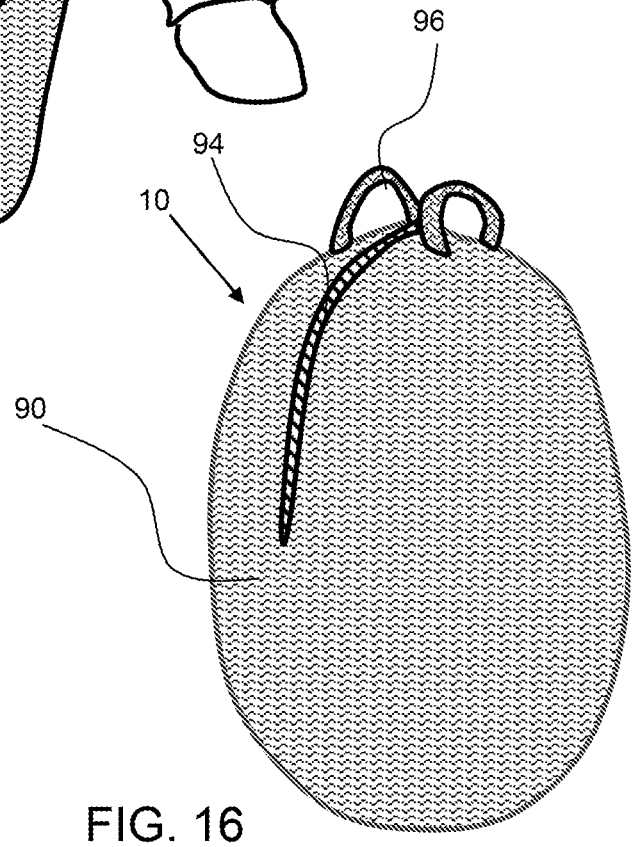
FIG. 16 shows a perspective view of the collapsed floating insect canopy configured in the case, a bag.

Referring now to FIGS. 13 to 16, an exemplary floating insect canopy 10 can be collapsed and folded to be stored in a compact form, such as in a case 90. The first end 30 and second end 32 of the floating insect canopy 10 may be folded together to enable a compact size for fitting within the case 90, as shown in FIGS. 13 and 14. As shown in FIG. 15, the folded canopy enclosure 16, may be placed into a case 90, such as a bag. As shown in FIG. 16, the case 90 has a case closure 94, such as a zipper or hook-and-loop fastener, and a handle 96.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. A floating insect canopy comprising:
   a) a canopy forming a canopy enclosure having a canopy perimeter;
   b) a float configured around the canopy perimeter;

c) a flexible extension;

d) an extension retainer that retains the flexible extension to the canopy to automatically form the canopy enclosure; and e) an extension strap that extends across from a door side to a canopy side of the floating insect canopy and is coupled to the float;

f) a float sleeve;

wherein the float is foam and wherein the float sleeve is configured around the float; and wherein the canopy comprises a netting.

2. The floating insect canopy of claim 1, wherein the flexible extension that-automatically forms the canopy enclosure.

3. The floating insect canopy of claim 2, wherein the extension sleeve forms a hoop.

4. The floating insect canopy of claim 3, wherein the flexible extension extends along a hyperbolic paraboloid perimeter having a back extension that extends down from a top of the canopy along the canopy side of the floating insect canopy and a door extension extending down from said top of the canopy along the door side of the floating insect canopy.

5. The floating insect canopy of claim 4, wherein the canopy comprises a door panel having a door panel closure configured to open said door panel.

6. The floating insect canopy of claim 1, wherein the flexible extension extends along a hyperbolic paraboloid perimeter having a back extension that extends down from a top of the canopy along the canopy side of the floating insect canopy and a door extension extending down from said top of the canopy along the door side of the floating insect canopy.

7. The floating insect canopy of claim 6, wherein the extension retainer is an extension sleeve and wherein the flexible extension is configured within the extension sleeve to form a hoop.

8. The floating insect canopy of claim 6, wherein the canopy comprises a first end panel that is configured on a first end of the floating insect canopy and a second end panel is configured on a second end of the floating insect canopy, and wherein the flexible extension is configured between the first end panel and the second end panel.

9. The floating insect canopy of claim 8, wherein the canopy comprises a door panel having a door panel closure configured to open said door panel.

10. The floating insect canopy of claim 9, wherein the door panel is configured within the door extension of the flexible extension.

11. The floating insect canopy of claim 10, wherein the extension retainer is an extension sleeve and wherein the flexible extension is configured within the extension sleeve to form a hoop.

12. The floating insect canopy of claim 11, wherein the extension sleeve forms a hoop.

13. The floating insect canopy of claim 1, wherein the flexible extension is a flexible rod.

14. The floating insect canopy of claim 13, wherein the flexible extension is a plastic rod.

15. The floating insect canopy of claim 1, wherein the float is configured in a float ring forming a base opening into the canopy enclosure.

16. The floating insect canopy of claim 1, wherein the floating insect canopy is configured to be folded and configured in a case.

17. The floating insect canopy of claim 1, further comprising a strap length adjuster configured to change the length of the extension strap to draw the door side toward the canopy side.

18. The floating insect canopy of claim 17, wherein the strap length adjuster is a buckle.

* * * * *